United States Patent [19]
Sadler

[11] 3,893,515
[45] July 8, 1975

[54] ALL PURPOSE HOE AND DUSTER

[76] Inventor: Cecil Sadler, Rt. 10, Box 756, Tallahassee, Fla. 32304

[22] Filed: June 6, 1973

[21] Appl. No.: 367,453

[52] U.S. Cl. .................... 172/60; 172/71; 172/462
[51] Int. Cl. ............................................ A01b 33/00
[58] Field of Search ......... 172/60, 57, 71, 555, 120, 172/123, 118, 125; 111/8

[56] References Cited
UNITED STATES PATENTS

| | | | |
|---|---|---|---|
| 380,422 | 4/1888 | Clark | 172/555 |
| 2,310,735 | 2/1943 | Greer | 172/555 |
| 2,616,348 | 11/1952 | Ariens | 172/462 X |
| 3,202,221 | 8/1965 | Monk et al. | 172/60 X |
| 3,263,756 | 8/1966 | Hines, Sr. | 172/60 |
| 3,367,293 | 2/1968 | Cox | 172/71 X |

*Primary Examiner*—Stephen C. Pellegrino
*Attorney, Agent, or Firm*—Clarence A. O'Brien; Harvey B. Jacobson

[57] ABSTRACT

A cultivating attachment having a frame mountable on a vehicle, and a plurality of opposed pairs of cantilever mounted mandrel shafts rotatably mounted on the frame. Each shaft, which may be rotated by power from the vehicle by way of a common, frame mounted main shaft, is arranged for selectively receiving a desired arrangement of earth moving hoe blades. Rakes may be adjustably associated with the mandrel shafts, and a dusting device arranged on the frame for passing a dusting material through hose discharge nozzles arranged between opposed pairs of the mandrel shafts.

2 Claims, 8 Drawing Figures

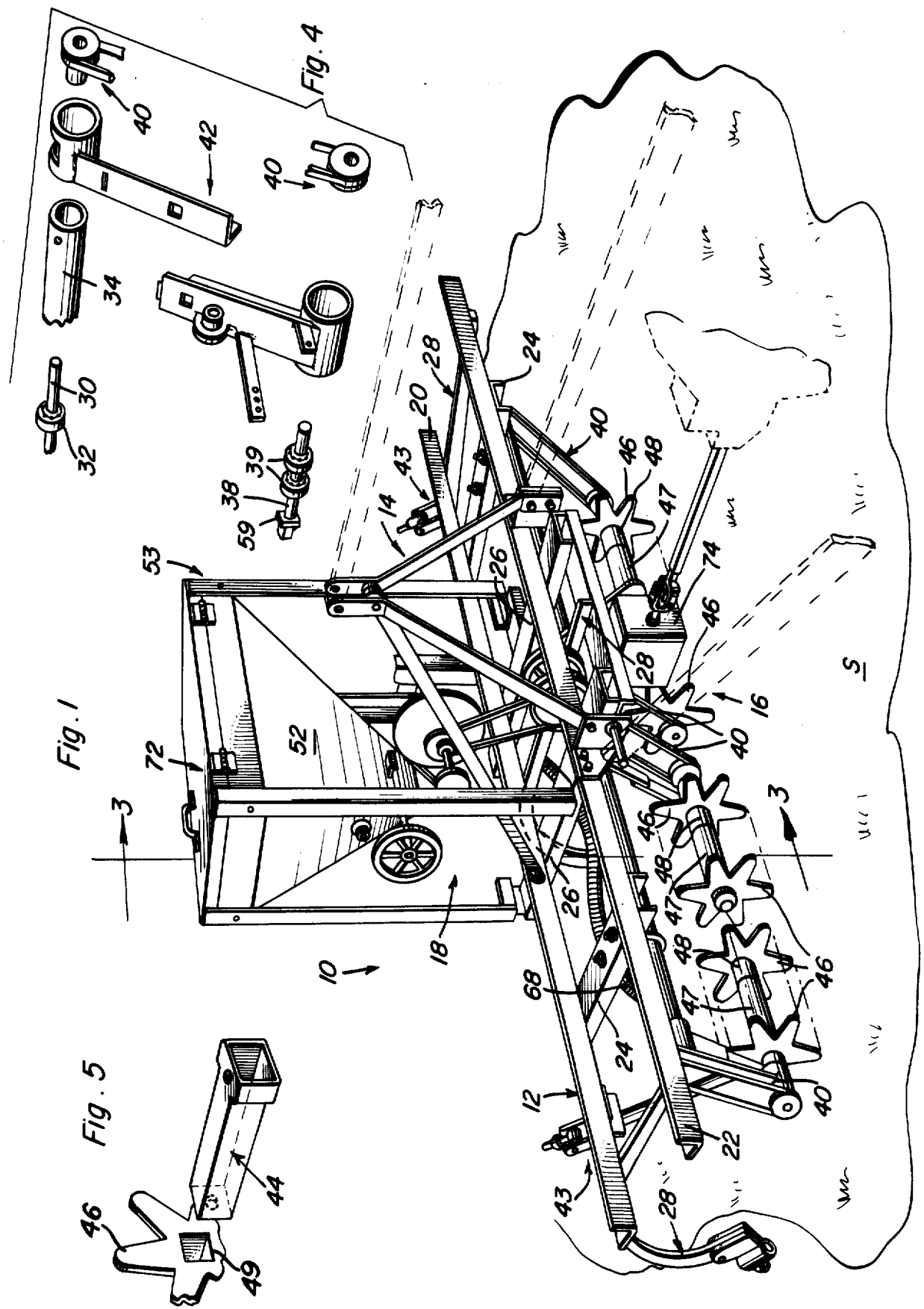

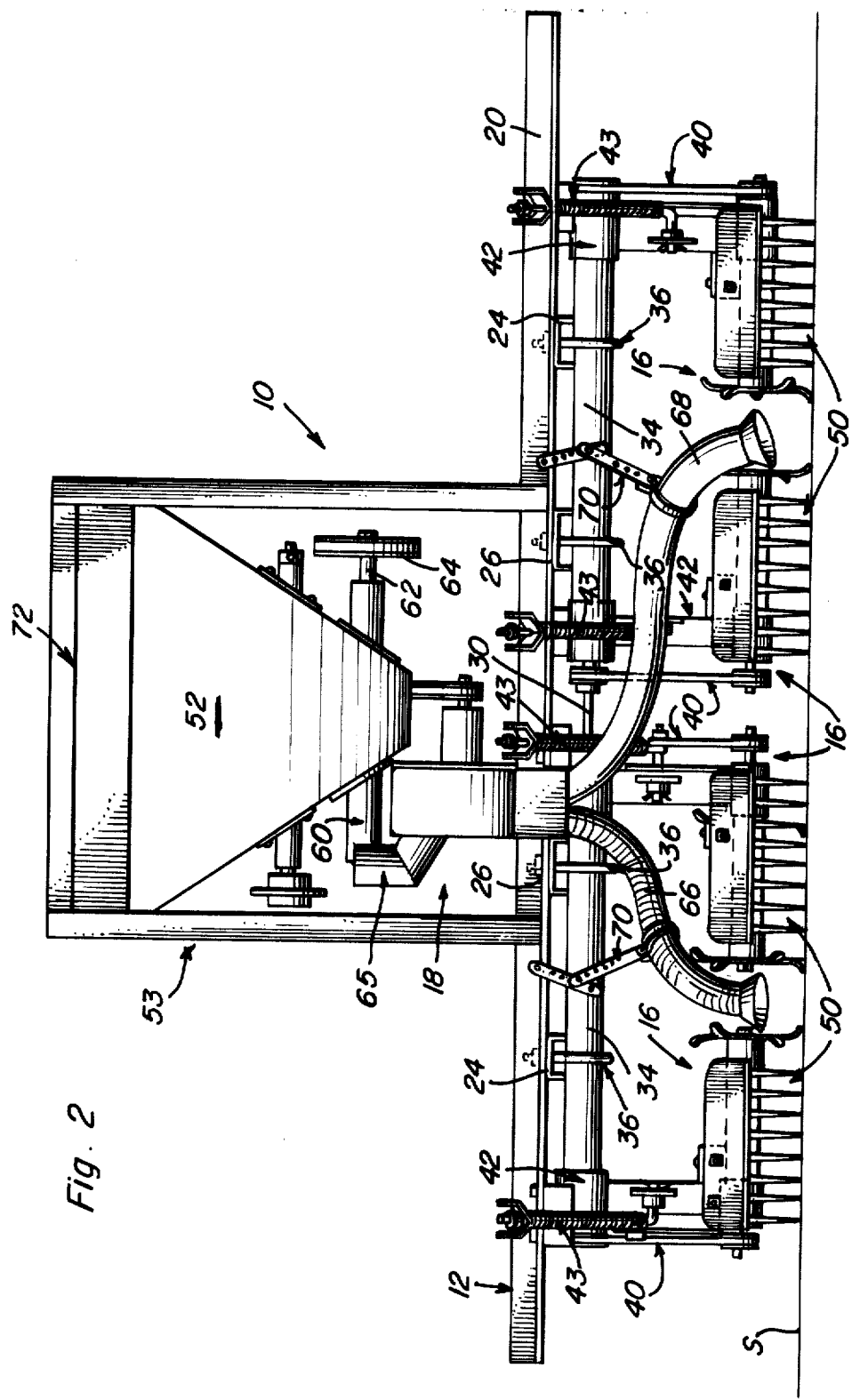

ALL PURPOSE HOE AND DUSTER

BACKGROUND OF THE INVENTION

1. Field of the Invention

This invention relates generally to cultivating apparatus, and particularly to a versatile earth moving and dusting cultivator attachment for farm tractors and other suitable agricultural vehicles, and the like.

2. Description of the Prior Art

It is known to perform agricultural cultivating operations by means of rotating discs having projecting points or teeth which move earth, and the like, in the manner of a spade or harrow. U.S. Pat. No. 551,395, for example, discloses such a disc having a rectangular central opening for facilitating the mounting of the disc on a suitable shaft as by means of a specially constructed collar or spool. Among the disadvantages of this known arrangement, however, is the manner in which the collar or spool is keyed to the disc-mounting shaft, since the rectangular central opening of the disc only facilitates mounting of the latter on its associated collar or spool. In effect, the disc is mounted on a hub-forming collar or spool to form a unit mountable on a shaft. Since the disc must rotate with the shaft, some manner of locking or keying the collar or spool to the shaft must be provided.

The use of dusting apparatus in combination with cultivating elements is also generally known in the agricultural arts. See, for example, U.S. Pat. No. 2,115,199.

SUMMARY OF THE INVENTION

It is an object of the present invention to provide a cultivating attachment which affords more versatility as regards meeting specific job requirements than known cultivating attachments.

It is another object of the present invention to provide in a cultivating attachment employing rotating blades increased efficiency, versatility, and reliability than found in known attachments of this kind.

It is yet another object of the present invention to provide combined earth moving and dusting apparatus of improved efficiency, versatility, and reliability when compared to known apparatus of this kind.

These and other objects are achieved according to the present invention by providing a cultivating attachment having a frame and elements mounted on the frame for moving earth in an area traversed by the frame. Advantageously, a dusting device is mounted on the frame together with the earth moving elements.

According to a preferred embodiment of the present invention, the earth moving elements are part of an arrangement including a rotatably mounted main shaft arranged for selective rotation as by a power take-off from a vehicle to which the frame is attached. At least one mandrel shaft is arranged spaced from and substantially parallel to the main shaft. In practice, there will usually be a plurality of opposed pairs of such mandrel shafts cantilever mounted to bearing arm assemblies extending from the frame. Conventional drive train assemblies may be provided for transmitting power from the main shaft to each mandrel shaft. Advantageously, one or more hoe blades are mounted on the mandrel shafts as by a mandrel arrangeable itself on the mandrel shafts, and provided with a cross section in the form of a parallel pipe head which mates with a similarly configured control opening of the hoe blade being mounted.

Each mandrel shaft may have associated with it a rake mounted on a brace forming part of the bearing arm assembly to which the particular mandrel shaft is cantilever mounted.

A preferred dusting apparatus according to the present invention has a screw conveyor arranged for feeding the dusting material from a hopper to a blower which distributes the material through hoses having discharge nozzles arranged between the mandrel shafts forming opposed pairs of such shafts. An agitator may be arranged in the hopper for facilitating discharge of the material from the hopper into the screw conveyor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, right-front, perspective view showing a cultivating attachment according to the present invention.

FIG. 2 is a rear elevational view showing the cultivating attachment of FIG. 1.

FIG. 4 is a fragmentary, exploded perspective view showing a detail of the cultivating attachment of FIGS. 1 to 3.

FIG. 5 is an exploded, perspective view showing another detail of the cultivating attachment of FIGS. 1 to 3.

DESCRIPTION OF THE PREFERRED EMBODIMENTS

Figure 3:
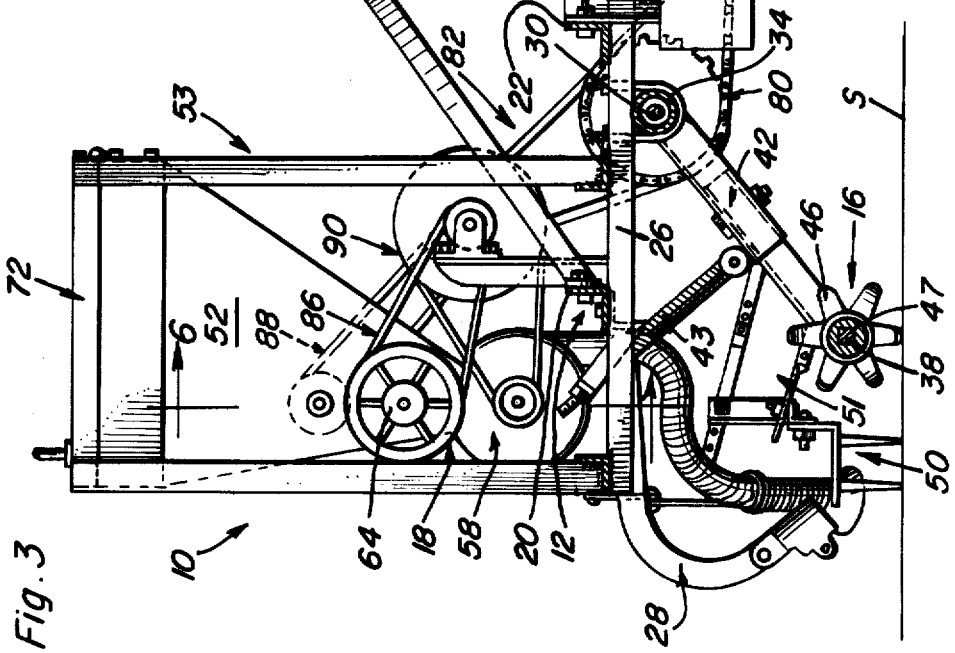
FIG. 3 is a fragmentary, sectional view taken generally along the line 3—3 of FIG. 1.

Referring now more particularly to FIGS. 1 to 3 of the drawings, there is illustrated a cultivating attachment 10 according to the present invention having a frame 12 which may be mounted on a conventional farm tractor, and the like (not shown), as by a conventional 3-point hitch assembly 14. Since such a hitch is familiar to those involved in agricultural arts, it will not be discussed further herein. An arrangement 16 is mounted on frame 12 for moving earth, designated generally by the letter "S", and cultivating same in an area traversed by frame 12. Advantageously combined with arrangement 16 is a dusting arrangement 18 also mounted on frame 12 and arranged for distributing a suitable, known dusting material, such as a conventional insecticide, in the area traversed by frame 12.

A pair of longitudinally extending substantially parallel rails 20 and 22, angle members being shown in the drawings, are advantageously employed to form frame 12 in a conventional manner as by tying rails 20 and 22 together with a plurality of braces 24 and 26. A plurality of brackets 28 are shown provided on frame 12 and extending between rails 20 and 22 for selectively mounting conventional tines (not shown) and the like whenever the use of such implements is indicated.

The preferred embodiment of an earth moving arrangement 16 illustrated in FIGS. 1 to 3 of the drawings has a main shaft rotatably mounted on frame 12 and arranged for selective rotation as by a power take-off to be discussed below. Shaft 30 is provided with bearings 32 permitting the shaft to be journalled in cylindrical shaft housings 34. Conventional U-shaped hangers 36 secure housings 34, and, therefore, shaft 30 to rail 22 of frame 12. A plurality of mandrel shafts 38 (FIG. 4) are provided with bearings 39 and a pulley at one end which cooperates with other elements to form a, for example, belt and pulley assembly 40. Each mandrel shaft 38 is associated with such an assembly 40. It is to be understood, of course, that any suitable, known drive train may be substituted for these assemblies. Shafts 38 are journalled to frame 12 as by bearings 39 being arranged in portions of bearing arm assemblies 42. Each assembly 42 has a portion spaced from the portion in which bearings 39 are journalled pivotally mounted to housings 34 of main shafts 30. Spring-biased braces 43 form a portion of a bearing arm assembly 42, and permit a resilient, or cushioned, movement of each assembly 42. In this manner, each mandrel shaft 38 is provided with a shock-absorbing assembly arrangement. A mandrel 44 (FIG. 5) having a cross section in the form of a parallelepiped, a square being illustrated, is arrangeable on an associated mandrel shaft 38. These mandrels 44 permit one or more hoe blades 46, which may have six points as illustrated, to be quickly and easily mounted on shafts 38 for rotation therewith. This mounting is facilitated by providing a plurality of spaces 47 and 48 which permit blades 46 to be spaced from one another, and substitute for blades 44 omitted from a particular shaft 38 for any desired reason.

As can best be seen from FIG. 5 of the drawings, each hoe blade 46 is provided with a central opening 49 having a periphery arranged for mating with the cross section of a mandrel 44. In this manner, each blade 46, as well as spaces 47 and 48, are quickly and easily keyed to an associated mandrel 44 for rotation therewith. Mandrels 44 are in turn keyed to the associated shaft 38 as by the enlarged end portion of a mandrel 44 engaging with a mating projection 59 formed on a shaft 38.

As can be readily appreciated from the drawings, mandrel shafts 38 are arranged in a plurality of opposed pairs extending toward one another in cantilever fashion. Since each shaft 38 has an assembly 40 associated with it, power is easily transmitted from main shaft 30 to shafts 38.

A rake assembly 50 may be mounted on an associated bearing arm assembly 42 as by a four-bar linkage 51 (FIG. 3). Since linkages 51 are easily adjustable by placing, for example, screw fasteners in specific holes provided in bars of linkage 51, a rake assembly 50 is provided which is adjustable to meet the specific requirements called for by an associated mandrel shaft 38.

Figure 7:
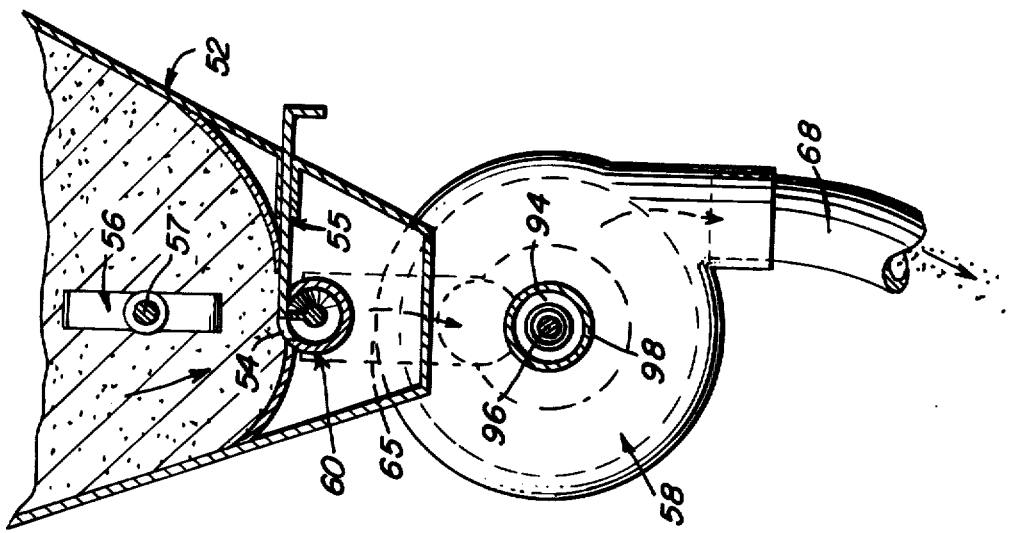
FIG. 7 is a fragmentary, sectional view taken generally along the line 7—7 of FIG. 6.
Figure 6:
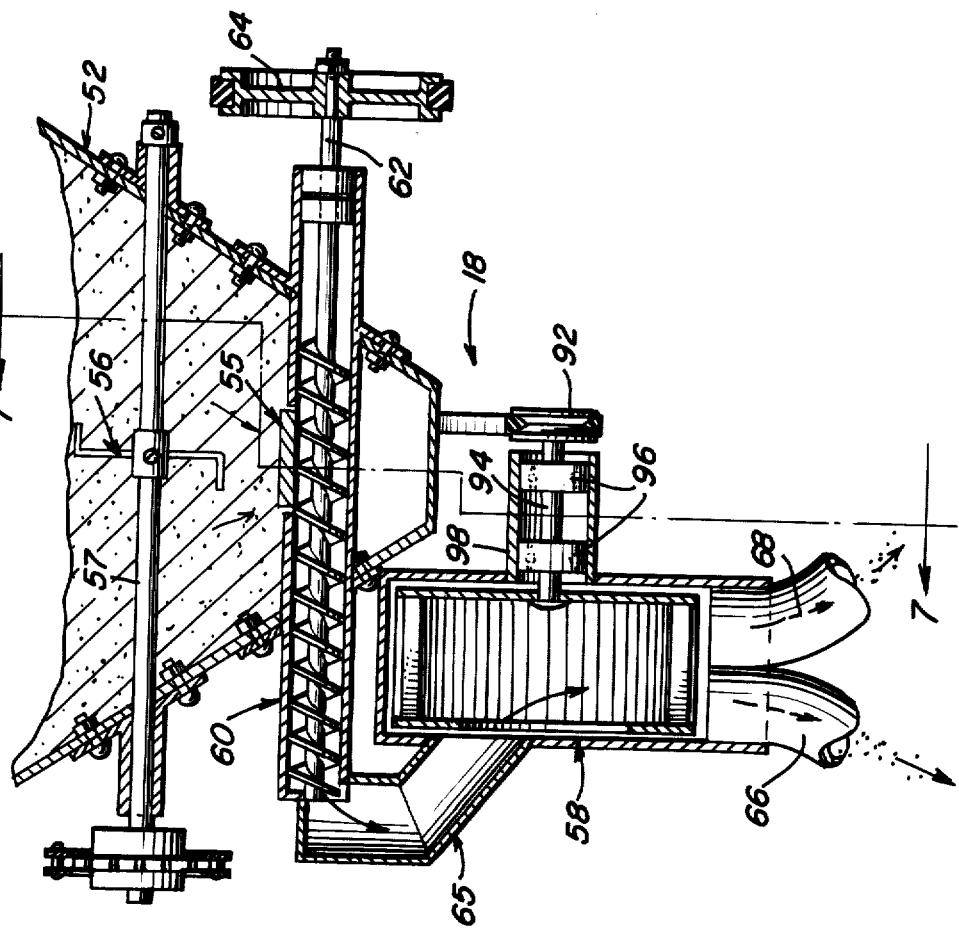
FIG. 6 is a fragmentary, sectional view taken generally along the line 6—6 of FIG. 3.

Referring now to FIGS. 6 and 7 of the drawings, an arrangement 18 according to the present invention is provided with a hopper 52 mounted on frame 12 in a conventional manner as by a subframe 53, and provided with an outlet 54. A gate assembly 55 is arranged in outlet 54 for selectively blocking same and for controlling the amount of flow therethrough. An agitator 56 is advantageously mounted on a rotatable shaft 57 for agitating material in hopper 52 and facilitating the discharge of this material through outlet 54 and by gate assembly 55. A blower 58, which may be of conventional construction, communicates with outlet 54 as by a screw conveyor 60, which also may be of conventional construction, which receives material at outlet 54 and conveys it to blower 58 by means of conveying flutes extended from a shaft 62 provided with a pulley 64, and discharges the material into a chute 65 leading to the inlet of blower 58. The outlet of blower 58 is connected to a, for example, pair of hoses 66 each provided with discharge nozzles arranged between a pair of mandrel shafts 38, whereat the material is discharged after being transported from blower 38 by the hoses. Each hose 66, 68 is provided with an adjustable support bracket 70 (FIG. 2) for adjusting the exact position and height of same. These brackets may be of a conventional nature employing the concept of using a, for example, conventional screw fastening device in selected ones of a plurality of holes in metal bands, and the like. A cover assembly 72 of conventional construction may be arranged on top of hopper 52 for enclosing same.

Figure 8:
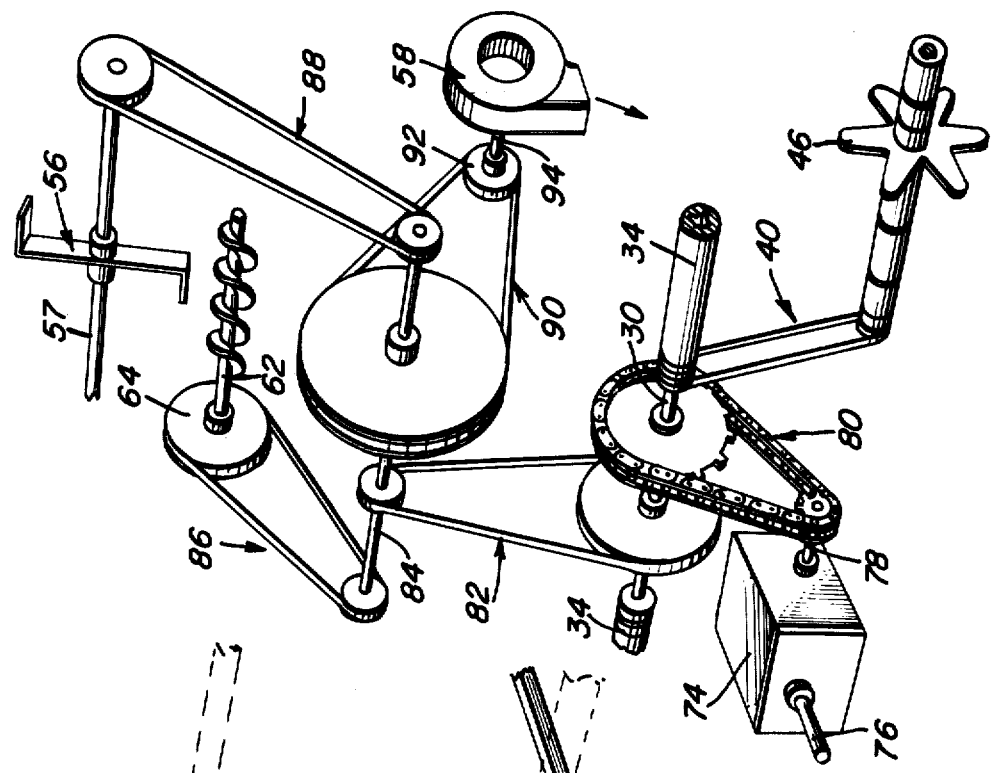
FIG. 8 is a fragmentary, perspective view showing a drive train arrangement for a cultivating attachment according to the present invention.

FIG. 8 of the drawings shows in a somewhat diagrammatic manner an overall view of the drive train for moving the various elements of cultivating attachment 10. The input to this drive train is through a conventional gear box 74 having a drive shaft 76 connected to the power output of a vehicle to which attachment 10 is mounted by hitch 14. Such power take-offs are conventional in the art, and will not be discussed in further detail herein. A shaft 78 exits gear box 74 at right angles to shaft 76, and is connected to a drive train 80. Although drive train 80 is illustrated as a conventional chain and sprocket drive, it is to be understood that this, and any of the other drives described herein, may be constructed in any suitable, known manner. Drive train 80 transfers power from shaft 78 to main shaft 30. A belt and pulley assembly 82 transfers power from shaft 30 to a shaft 84 which in turn distributes the power by means of assemblies 86, 88, and 90 to shafts 57, 62, and to a pulley 92 associated with a shaft 94 journalled as by bearings 96 in a housing 98 forming part of blower 58. The latter arrangement is best seen in FIG. 6 of the drawings. In this manner, power is transmitted to all the rotating shafts of the equipment.

As can be readily understood from the above description and from the drawings, a cultivating attachment 10 according to the present invention provides a versatile, efficient, and reliable device for performing the various cultivating and dusting jobs that arise from time to time in the practice of agriculture. The hoes, hoses, rakes, and the like, can be added, removed, and adjusted to fit the needs of a particular situation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A cultivating attachment, comprising, in combination:
   a. a frame;

b. means mounted on the frame for moving earth in an area traversed by the frame, the means for moving earth including:
  i. a rotatably mounted main shaft arranged on the frame for selective rotation;
  ii. a plurality of mandrel shafts arranged spaced from and substantially parallel to the main shaft;
  iii. belt means associated with all of the mandrel shafts for transmitting power from the main shaft to the mandrel shafts;
  iv. a plurality of hoe blades, each mandrel shaft having a plurality of hoe blades mounted thereon; and
  v. means for mounting the hoe blades on associated mandrel shafts for rotation therewith, the means for mounting including spacers associated with the blades for maintaining a predetermined spacing between them, bearing arm assemblies arranged for mounting the mandrel shafts, the mandrel shafts divided into pairs, with each pair mounted on associated bearing arms and arranged extending coaxially toward one another, and spring-biased braces forming portions of the bearing arm assemblies for permitting a cushioned movement of each bearing arm assembly and providing each mandrel shaft with a shock-absorbing assembly arrangement; and
c. a plurality of rakes mounted on the bearing arm assemblies and arranged rearwardly of and adjacent to the hoe blades.

2. A structure as defined in claim 1, wherein the mounting means is a plurality of mandrels arrangeable on the mandrel shafts and each having a cross section in the form of a parallelepiped, and the hoe blades each have six points and are provided with a central opening having a periphery arranged for mating with a mandrel.

* * * * *